(12) United States Patent
Brown

(10) Patent No.: US 7,309,198 B1
(45) Date of Patent: Dec. 18, 2007

(54) REUSABLE THREADED TIE DOWN

(76) Inventor: David J. Brown, 145 Rue Cezzan, Lavonia, GA (US) 30553

( * ) Notice: Subject to any disclaimer, the term of this patent is extended or adjusted under 35 U.S.C. 154(b) by 94 days.

(21) Appl. No.: 11/287,877

(22) Filed: Nov. 28, 2005

(51) Int. Cl.
*B61D 45/00* (2006.01)

(52) U.S. Cl. ...................................... 410/101

(58) Field of Classification Search ............... 410/101, 410/96
See application file for complete search history.

(56) References Cited

U.S. PATENT DOCUMENTS

| 4,717,147 | A | * | 1/1988 | Rochelle | ...................... 482/93 |
| D347,980 | S | * | 6/1994 | Butch | .............................. D8/1 |
| D381,892 | S | | 8/1997 | Porter et al. | |
| D398,363 | S | * | 9/1998 | LoBue | ....................... D21/840 |
| D492,586 | S | | 7/2004 | Rimer, Jr. | |

* cited by examiner

*Primary Examiner*—H Gutman
(74) *Attorney, Agent, or Firm*—J. Bennett Mullinax, LLC

(57) ABSTRACT

A reusable tie down is provided having a threaded portion for insertion in soil along with an arcuate head defining an aperture for securing a rope or line to the tie down. The tie down is constructed of a high impact, high tensile strength polycarbonate which may be deformed under a heavy load and then returned to a normal shape by the application of heat.

5 Claims, 3 Drawing Sheets

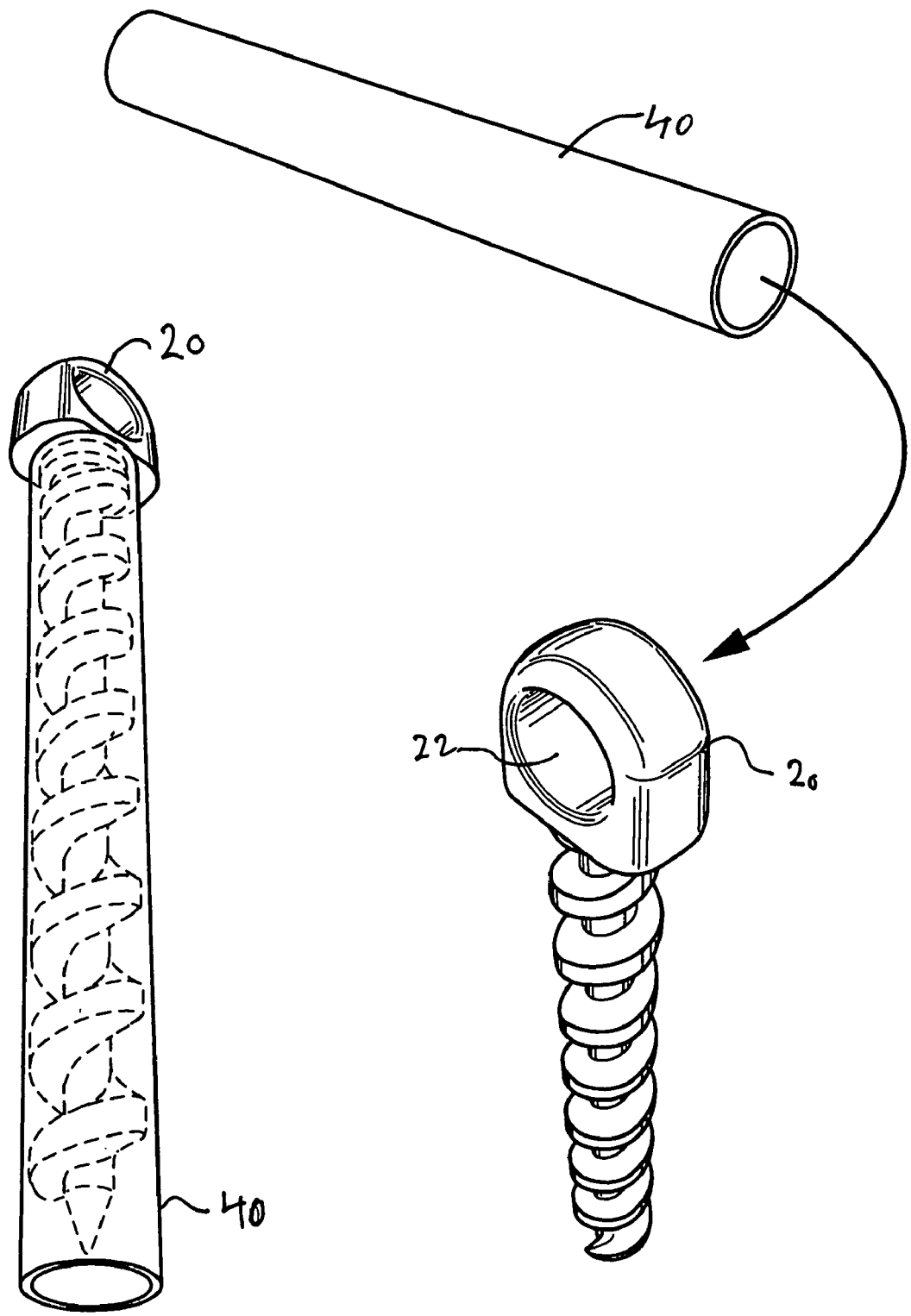
FIG. 3  FIG. 4

REUSABLE THREADED TIE DOWN

FIELD OF THE INVENTION

This invention is directed towards a reusable threaded tie down. The tie down includes a protective sheath which can be used as a handle for insertion and removal of the tie down into sand, soil, gravel, and similar materials. The tie down is suitable for a variety of uses including tethers, beach umbrellas, tent stakes, support stakes for new trees and shrubs, and pet tie downs.

BACKGROUND OF THE INVENTION

This invention relates to threaded or helical tie downs for use in soil, lawns, campgrounds, and beaches. As seen in reference to U.S. Pat. Nos. D381892 and D492586, the specifications of which are incorporated herein by reference, it is known to provide a threaded structure which includes a bracket or similar structure through which a rope, wire, or similar line may be attached.

Many of the threaded tie downs in the prior art are provided by metal or rigid plastics which are subject to rust, breakage, or permanent deformation if bent. Further, the cleat, head, or other attachment point of the tie down frequently has either a shape, contour, or outer dimensions which render it unsuitable for certain applications. For instance, animal tie downs are often used in association with a length of chain. The chain will frequently entangle around the attachment head of the tie down, interfering with the animal's range of movement. Further, many tie downs have an attachment head which is easily damaged if accidentally struck, while other designs pose an injury risk because of the shape of the head should one trip and/or land on an installed tie down.

Accordingly, there remains room for improvement and variation within the art.

SUMMARY OF THE INVENTION

It is one aspect of at least one of the present embodiments to provide for a threaded tie down which can be manually inserted and removed in a variety of soil types.

It is yet another aspect of at least one of the present embodiments to provide for a helical tie down which has a protective sheath surrounding the threaded portion of the tie down, the sheath further providing a handle for insertion through the head of the tie down to facilitate the installation and removal of the tie down from a substrate.

It is a further aspect of at least one embodiment of the present invention to provide for a helical tie down molded from a high impact polycarbonate plastic and having a tensile strength in excess of 22,000 pounds.

It is yet a further aspect of at least one embodiment of the present invention to provide for a helical tie down having a threaded portion attached to a head portion, the head portion containing an opening therethrough for securing a line, rope, or similar structure, the tie down head having a smooth, curved exterior surface.

It is a further aspect of at least one embodiment of the present invention to provide for a helical tie down which is provided from a high impact elastic polycarbonate which allows the tie down to be bent at an angle in excess of 30° and which can be restored to the original shape once the load is removed.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 3 illustrates the helical anchor with a protective sheath in place surrounding the threaded portions of the helical anchor.

FIGS. 4 and 5 illustrate placement of the protective sheath through the head of the helical anchor to facilitate the insertion and removal of the helical anchor into the soil.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
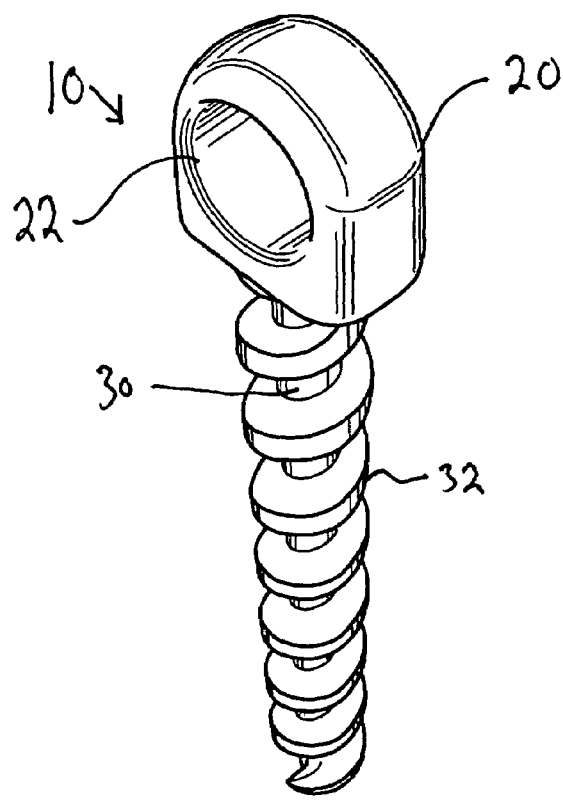
FIG. 1 is an upper perspective view of a helical anchor of the present invention.
Figure 2:
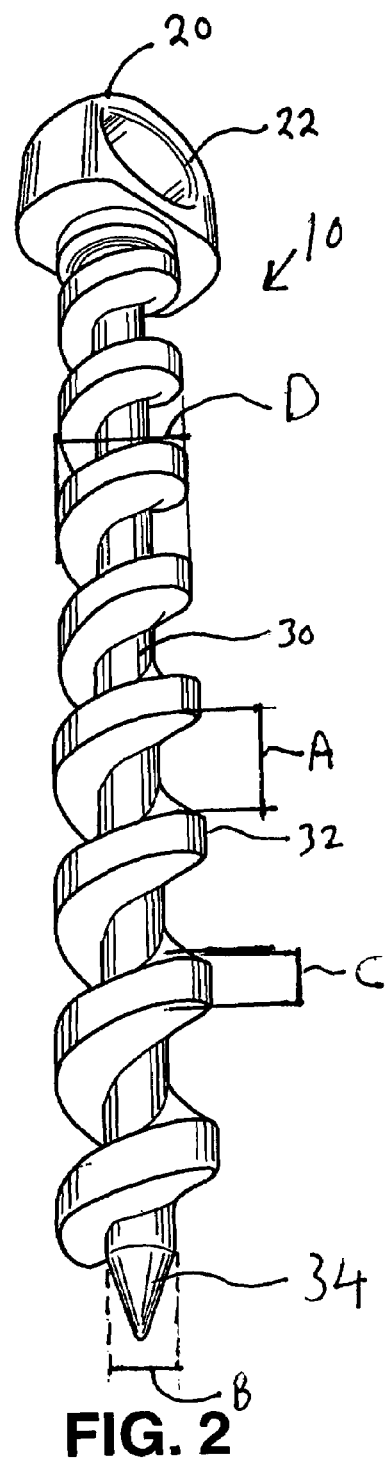
FIG. 2 is an elevational view of a helical anchor as seen in FIG. 1.

As best seen in reference to FIGS. 1 and 2, a threaded tie down 10 is provided having a head portion 20 and a shaft 30. The head 20 has a width which is approximately twice its thickness. Further, the width of the head defines a generally arcuate exterior surface which is devoid of any sharp angles or other surface features. An aperture 22 is defined through the length of the head 20, aperture 22 providing a location for a thread, rope, or other similar article to be attached to the tie down 10. As further seen in reference to FIGS. 1 and 2, the shaft 30 further defines helical threads 32 which extend from a position adjacent a tapered point 34 to where shaft 30 meets with head 20. As seen in reference to FIG. 2, the helical threads 32 are positioned approximately $18/32$ of an inch from the adjacent winding as indicated by reference line "A". Further, threads 32 define smooth, exterior edge wall surfaces which increase the strength and durability of the helical threads 32.

As seen in reference to FIG. 2, the helical threads 32 have a thickness "C" which is about 0.5 inch. The helical threads have a pitch of about 9 windings per foot and are wound at an approximate 45° angle relative to an axis of shaft 30. As also seen in reference to FIG. 2, the thickness "C" of the helical windings, in combination with the distance "A" between the adjacent helices, are such that a significant portion of at least about 50% of the shaft 30 is not covered with the helical threads 32. The combination of the relative thickness between the diameter of shaft 30, the outer diameter of threads 32, the smooth edge wall surfaces, and the at least about 50% of the gap distance "A" represents a useful balance of dimensions that facilitates the insertion of the threaded tie down into a variety of substrates while giving the threaded tie down the flexibility to bend under heavy loads without permanent deformation or damage to the helical tie down.

The shaft 30, as seen by reference line "B" in FIG. 2 has a diameter of approximately ½" while the outer diameter of the shaft 30 including the helical threads 32 has a thickness of approximately 1⅛" as seen by reference line "D". The outer diameter of helical threads 32 gradually increases such that the outer diameter "D" when measured below the head 20 is approximately 1/32" of an inch greater than the diameter when measured the tip. The slight taper of the threads facilitates the insertion and provides for an enhanced anchoring force of the tie down 10 when inserted into a soil substrate.

As seen in reference to FIG. 3, a sheath 40 is provided which may function as both a storage tube and a handle. In FIG. 3, the shaft 30 may be inserted into the hollow sheath 40, a portion of sheath 40 extending past the tip 34 positioned over the threaded portion of the tie down 10.

The sheath 40 may be provided by a length of hollow PVC pipe. Preferably, the inner diameter of the PVC pipe is slightly greater than the outer diameter of the shaft 30 and helical threads 32 such that when the tie down 10 is inserted into the length of sheath 40, a tight friction fit is provided which keeps the respective components in place until withdrawn by the user.

Figure 5:
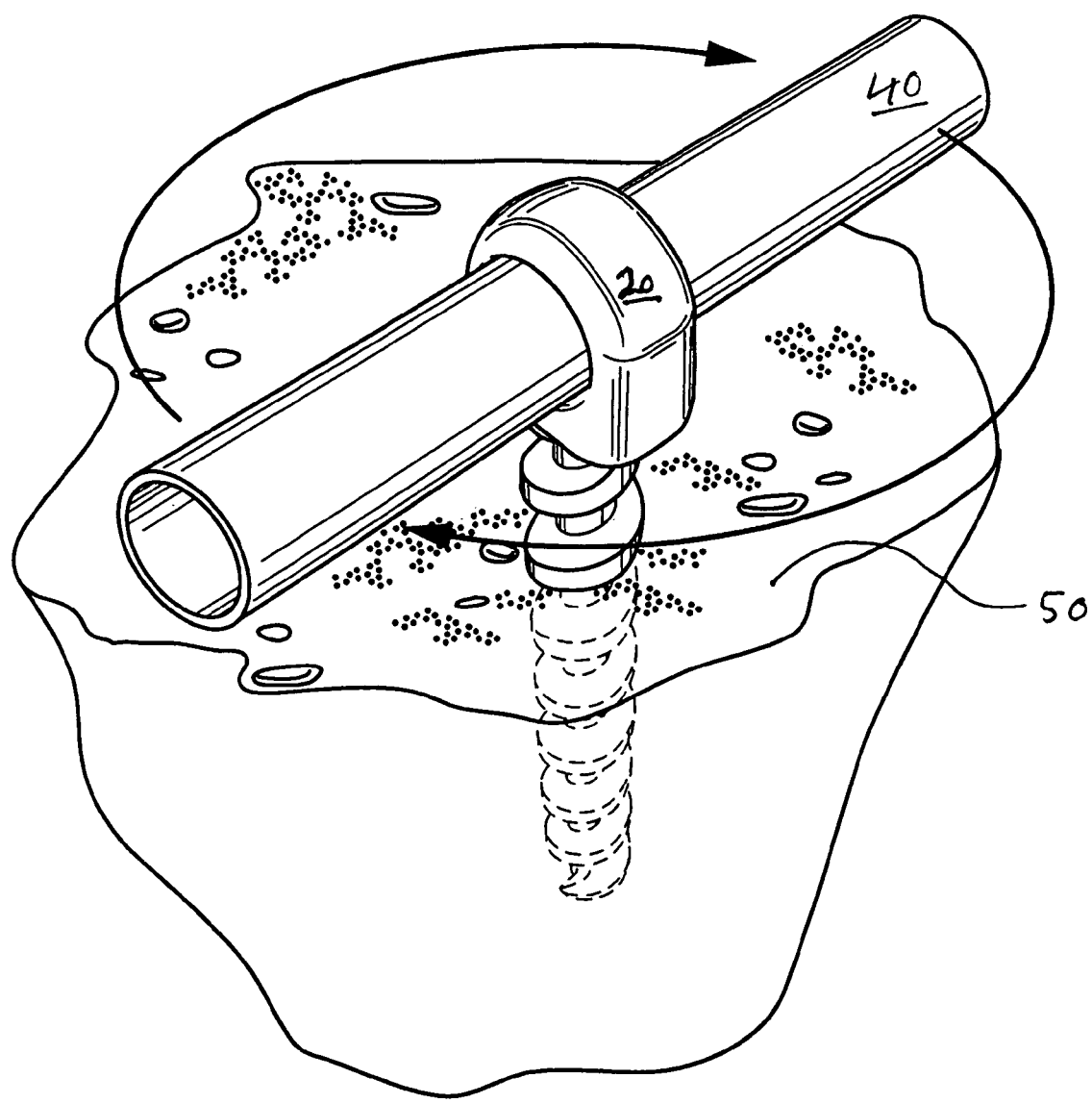

As seen in reference to FIG. 4, when the sheath 40 is removed from the shaft 30, the sheath 40 may be inserted through aperture 22 so as to provide a handle useful for the insertion and removal of the tie down 10 relative to a soil substrate. As seen in reference to FIG. 5, the sheath 40 allows for greater leverage to be applied for insertion (and removal) of the tie down 10 into the soil.

The tie down 10 may be used in a variety of soil types and fulfill a number of different functions. The tie down 10 is preferably made of a high impact polycarbonate which may be used to injection mold the tie down 10. Suitable polycarbonates include high flow polycarbonates available from DuPont. Other resins which are believed useful include high impact acrylonitrile butadiene styrene (ABS) resins and high density polyethylene resins.

In one embodiment of tie down 10 formed from a high impact polycarbonate, the overall length of the tie down is approximately 13" having a threaded outer diameter of approximately 1⅛". The embodiment described above exhibits a tensile strength of over 22,000 lbs. In addition, a 4,000 lb. force may be applied at a 30° angle without breaking the helical tie down. When subjected to strong forces, the helical tie down may bend in response to the forces. However, upon removal of the force, subsequent warming of the tie down to a temperature of about 100° F. will restore the tie down 10 to its original shape.

The tie down 10 is able to function in a wide variety of substrates. The tie down 10 can easily be inserted into a sandy beach where it can be used to tether a beach umbrella, shade canopies, or other articles which require a tether to prevent being blown in the wind. The tie down 10 is also useful as a tool for anchoring tents and other camping equipment. Many commercial campgrounds place tent pads on a gravel bed. The tie down 10 is able to be inserted into the gravel substrate without bending or breaking, unlike conventional metal pins, metal stakes, and/or plastic pegs.

The sheath 40 provides a protective sheath which allows the safe transport and handling of the tie down 10 while also providing a useful handle for the insertion and removal of the tie down. The sheath 40 supplies sufficient torque that installation and removal of the tie down can be accomplished without resorting to hammering or side-to-side "rocking" of the tie down in order to remove it.

The arcuate, rounded shaped head 20 provides for a smooth attachment point which does not fray or abrade ropes or other materials used to fasten an object to the tie down 10. The large, rounded shape head is also less likely to cause injury if stepped upon.

The arcuate shape of head 20 has additional advantages when tie down 10 is used as a tether for an animal. The smooth exterior shape of head 20 prevents the cord, chain, or other tether from binding or being wrapped around the head 20. As a result, the movement of the animal is not unduly restricted by having the tether bound or wrapped around a tie down. The shape of the head 20 allows use of the tie down 10 as a tether without the necessity of a swivel which is often required in other prior art designs to prevent entanglement between the tether and the tie down 10.

As is readily appreciated by one having ordinary skill in the art, the size and dimensions of the illustrated embodiment can be varied for various needs. For instance, smaller diameter and smaller height tie downs may be used for recreational tent camping. Larger tie downs, such as the described embodiment, are useful as a tether in sandy soils, having sufficient height and width to tightly adhere to the loose soil.

Tie downs 10 may be used as a bank or beach cleat to attach or stabilize a boat. Further uses include use as landscaping tethers for positioning new trees and shrubs. The tie down 10 may also be used as temporary markers for fence and post layouts, measurement of property lines, construction wall layouts, and establishing plant bed boundaries. Since the tie downs 10 are not driven by a hammer, the use of tie downs significantly reduces the hazard of puncturing a below ground cable or pipe.

Tie downs 10 may also be used as a convenient way of staking out a volley ball or badminton net as well as providing visible markers for various construction purposes, such as marking utility lines, boundary lines, and other semi-permanent marking systems.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

What is claimed is:

1. A tie down comprising:
   a shaft;
   a plurality of threads operatively disposed on an exterior of said shaft;
   a head, said head defining an arcuate exterior surface, said head further defining a bore therethrough extending through a width of the head; and,
   a sleeve positionable between a first position as a sheath engaging an exterior of the shaft and a second position wherein said sleeve is inserted through said bore.

2. The tie down according to claim 1 wherein said tie down is injection molded from a material selected from the group consisting of high flow polycarbonates, high impact, acrylonitrile butadiene styrene and high density polyethylene.

3. The tie down according to claim 1 wherein said plurality of threads have a pitch of approximately 1 winding per about 1.25 inches.

4. The tie down according to claim 1 wherein said threads are wound about said shaft at an angle of approximately 45°.

5. A tie down comprising:
   a shaft;
   a plurality of threads having a wind angle relative to said shaft of about 45° and operatively disposed on an exterior of said shaft, said threads having a thickness of about 0.5 inches and providing an outer diameter of said threads and said shaft of substantially about 1.2 inches;
   a head defining an arcuate exterior surface, said head further defining a bore therethrough extending through a width of the head; and,
   a sleeve positionable between a first position as a sheath engaging an exterior of the shaft and a second position wherein said sleeve is inserted through said bore.

* * * * *